United States Patent
Buskirk et al.

(10) Patent No.: US 10,327,095 B2
(45) Date of Patent: Jun. 18, 2019

(54) SYSTEM AND METHOD FOR DYNAMICALLY GENERATED REPORTS

(71) Applicant: Interactive Intelligence Group, Inc., Indianapolis, IN (US)

(72) Inventors: Martin C. Buskirk, Creedmoor, NC (US); Kenneth D. Dickinson, Wake Forest, NC (US)

( * ) Notice: Subject to any disclaimer, the term of this patent is extended or adjusted under 35 U.S.C. 154(b) by 52 days.

(21) Appl. No.: 14/944,599

(22) Filed: Nov. 18, 2015

(65) Prior Publication Data
US 2017/0142548 A1    May 18, 2017

(51) Int. Cl.
*H04W 4/02*     (2018.01)
*H04W 4/021*    (2018.01)
*H04L 29/08*    (2006.01)
*H04W 4/029*    (2018.01)
*H04M 3/51*     (2006.01)

(52) U.S. Cl.
CPC ............ *H04W 4/021* (2013.01); *H04L 67/22* (2013.01); *H04W 4/023* (2013.01); *H04W 4/029* (2018.02); *H04M 3/5175* (2013.01)

(58) Field of Classification Search
CPC ..... H04W 4/021; H04W 4/023; H04W 4/028; H04L 67/18; H04L 67/22; H04M 3/5175
See application file for complete search history.

(56) References Cited

U.S. PATENT DOCUMENTS

| | | | | |
|---|---|---|---|---|
| 9,070,119 B2* | 6/2015 | Catipon, Jr. | ......... | G06Q 10/109 |
| 9,105,000 B1* | 8/2015 | White | ............. | G06Q 10/06398 |
| 2002/0069031 A1* | 6/2002 | Lehman | ................... | B21B 37/50 |
| | | | | 702/178 |
| 2002/0111887 A1* | 8/2002 | McFarlane | ............. | G06Q 10/10 |
| | | | | 705/30 |
| 2002/0128803 A1* | 9/2002 | Skinner | ................... | B21B 37/50 |
| | | | | 702/188 |
| 2005/0183143 A1* | 8/2005 | Anderholm | ............. | G06F 11/32 |
| | | | | 726/22 |
| 2006/0020503 A1* | 1/2006 | Harris | .................... | G06Q 10/10 |
| | | | | 705/7.42 |
| 2006/0284838 A1* | 12/2006 | Tsatalos | ............. | G06Q 10/0637 |
| | | | | 345/156 |
| 2007/0156741 A1* | 7/2007 | O'Sullivan | ............ | G06Q 10/10 |
| 2008/0004748 A1* | 1/2008 | Butler | .................... | G06Q 30/02 |
| | | | | 700/244 |
| 2009/0012760 A1* | 1/2009 | Schunemann | ......... | G06Q 10/06 |
| | | | | 703/6 |
| 2009/0132579 A1* | 5/2009 | Kwang | ................... | H04L 67/22 |
| 2009/0144102 A1* | 6/2009 | Lopez | .................. | G06F 21/552 |
| | | | | 705/7.11 |
| 2009/0222552 A1* | 9/2009 | Chroscielewski | .. | G06F 11/3438 |
| | | | | 709/224 |

(Continued)

*Primary Examiner* — Nathan A Mitchell

(57) ABSTRACT

A system and method are presented for dynamically generated reports. In an embodiment, a first device is associated with events, such that when the events occur, they trigger the sending of information to a second device. The second device accesses information relating to the first device and uses this information to generate data and/or alerts related to the first device. In an embodiment, the events associated with the first device comprise crossing a pre-determined geo-fence, specific GPS coordinates, networks, etc. Events may also originate from user actions in an application and external sources.

32 Claims, 2 Drawing Sheets

(56) References Cited

U.S. PATENT DOCUMENTS

| | | | | |
|---|---|---|---|---|
| 2013/0297468 A1* | 11/2013 | Hirsch | ............... | G06Q 40/00 |
| | | | | 705/32 |
| 2014/0058801 A1* | 2/2014 | Deodhar | ............ | G06Q 10/0639 |
| | | | | 705/7.38 |
| 2015/0013010 A1* | 1/2015 | Rozenzweig | ....... | G06F 11/3438 |
| | | | | 726/24 |
| 2015/0081487 A1* | 3/2015 | Porter | ................... | G06Q 50/22 |
| | | | | 705/32 |
| 2015/0180746 A1* | 6/2015 | Day, II | ................... | H04L 51/16 |
| | | | | 455/405 |
| 2015/0310565 A1* | 10/2015 | Fairbanks | .......... | H04L 63/0815 |
| | | | | 705/32 |
| 2015/0327011 A1* | 11/2015 | Fairbanks | ................ | G07C 1/10 |
| | | | | 455/456.3 |
| 2016/0117627 A1* | 4/2016 | Raj | ................ | G06Q 10/06398 |
| | | | | 705/7.42 |
| 2016/0125348 A1* | 5/2016 | Dyer | ...................... | H04W 4/04 |
| | | | | 705/7.42 |
| 2016/0306965 A1* | 10/2016 | Iyer | ....................... | G06Q 10/00 |

* cited by examiner

SYSTEM AND METHOD FOR DYNAMICALLY GENERATED REPORTS

BACKGROUND

The present invention generally relates to telecommunications systems and methods, as well as productivity management. More particularly, the present invention pertains to the generation of information triggered by events.

SUMMARY

A system and method are presented for dynamically generated reports. In an embodiment, a first device is associated with events, such that when the events occur, they trigger the sending of information to a second device. The second device accesses information relating to the first device and uses this information to generate data and/or alerts related to the first device. In an embodiment, the events associated with the first device comprise crossing a pre-determined geo-fence, specific GPS coordinates, networks, etc. Events may also originate from user actions in an application and external sources.

In one embodiment, a method is presented for generating reports comprising information related to a mobile device associated with a user, wherein the mobile device is operatively coupled to an electronic device, wherein the method comprises the steps of: gathering metrics, by the electronic device, from at least one of: the mobile device, one or more secondary sources associated with the electronic device, and one or more secondary sources associated with the mobile device; determining, by the electronic device, if an event has occurred, wherein if an event has occurred, storing the metrics related to the event in a database operatively connected to the electronic device through a network; analyzing the stored metrics, by the electronic device; and generating, by the electronic device, an activity report comprising the analyzed stored metrics.

In another embodiment, a method is presented for generating data related to a first device associated with a first user and a second device associated with a second user, wherein the first device is operatively coupled to the second device over a network, wherein the method comprises the steps of: gathering metrics, by the second device, from at least one of: the first device, one or more secondary sources associated with the second device, and one or more secondary sources associated with the first device; determining, if an event has occurred, by the first device, wherein if an event has occurred, notifying the second device and storing the metrics related to the event; analyzing the stored metrics, by the second device; and generating, by the second device, an activity report comprising the analyzed stored metrics.

DETAILED DESCRIPTION

Figure 1:
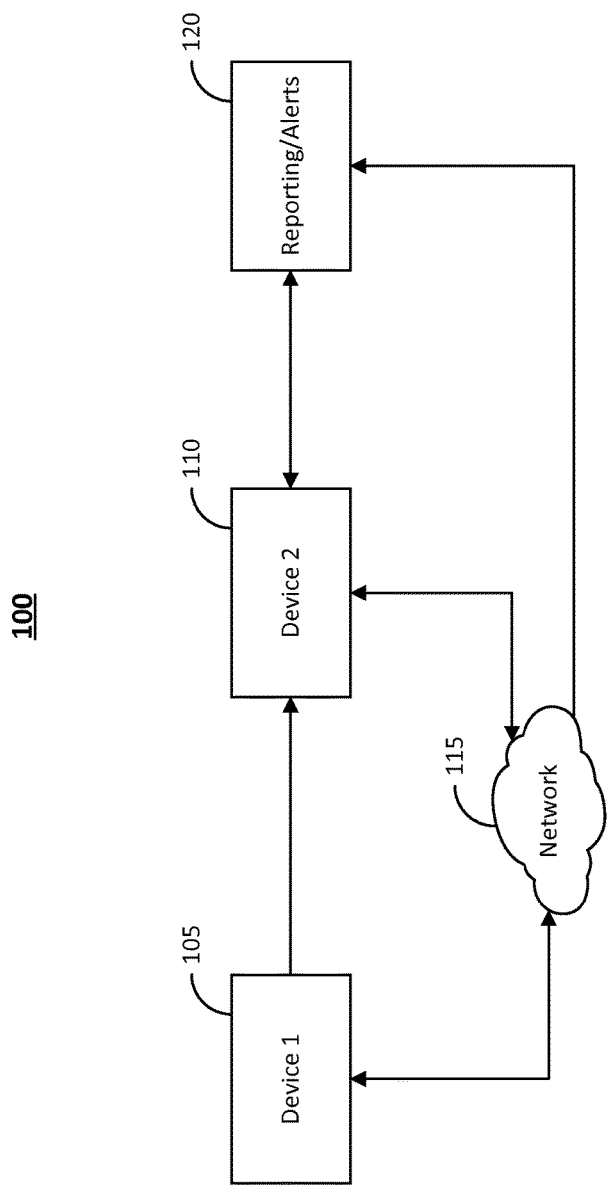
FIG. 1 is a diagram illustrating a system for dynamic generation of data.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Telecommuting employees have become more prevalent within companies in recent years. This has brought its challenges to the workplace as face time decreases in a physical office. In an enterprise environment, for example, it is desirable to know whether employees are where they are when they claim. For example, if an employee is telecommuting from another location, it might be desirable to know that this employee is working or has let their status become idle. It may also be desirable for a manager to keep track of the location active employees. In a contact center environment, it is important for managers to know that active employees are available in order to perform interactions.

FIG. 1 is a diagram illustrating a system for the dynamic generation of data, indicated generally at 100. The basic elements comprise a plurality of devices 105, 110, connected by a network 115, such as a cloud network. For simplicity, two devices are illustrated (105, 110), though it is within the scope of this disclosure for any number of devices to be connected. At least one of the plurality of devices is capable of generating output, such as reporting information and data 120. The network 115 may also comprise a means, such as a server or database, from which reporting data may be drawn. Secondary sources may also be connected through the network, such as Outlook or other sources from which reporting information may be drawn. For example, in an embodiment, an employer may house an employee database on an external system that exposes an API. In another embodiment, the employer may log employee badge swipes on another system and desires to reconcile that information with a geo-fence state. In another embodiment, information may be sourced from the internet, such as area traffic patterns, weather, construction zones, holidays, etc.

The device 105 may comprise a mobile device associated with a user. The device 105 generates metrics which are gathered by the device 110 and/or transmitted to the network 115. Examples of a mobile device may include lap top computers, smart phones, cards, wearable devices, GPS enabled devices, WiFi enabled devices, etc. Metrics, which may be generated, include status histories of a user associated with the device 105. For example, a status history may comprise whether a user is active or inactive in a system, which may further be correlated with periods of activity. Other histories may include, but not be limited to chat histories, location histories, and call recordings. Metrics may additionally be associated with periods of user activity, such as an interval of time (e.g. 30 minutes) spent by a user on a project. In a workplace environment, for example, a status history, may be correlated with periods of work by an employee. It may also be indicated when that employee stepped away from their work station and either manually or automatically had a change in status. Chat, voice calls, and transcripts may also be analyzed for specific keywords associated with different projects to estimate the amount of time an employee is working on a specific project. In another embodiment, content management activity may be monitored, such as documents accessed and shared, in order to examine worker activity.

The device 105 may also send and receive information through a network 115. The network 115 may reside locally or remotely. The network 115 may be hardware agnostic and is capable of residing in a public cloud, such as Amazon.com's Amazon Web Services, a private cloud, or an on premise system. The device 110 is also connected to the network 115 as well as to the device 105. Through the network 115, the devices 105 and 110 may access secondary sources. In an embodiment, the device 110 may be able to access secondary sources associated with the device 105, such as Microsoft Outlook, to name a non-limiting example. The network 115 may also be connected to a server for processing data and database(s) which house stored data.

The device 110 may comprise another mobile device or an electronic device. Examples include a lap top, a desktop computer, or a device with a computer processor. The device 110 may also be associated with another user. For example, in a workplace environment, the device 110 may be associated with a manager who is wanting to know how productive her employees are. In another example, the device 110 may be associated with a manager who has scheduling to perform, needs an external impact analysis, or assessments performed, among other tasks.

The device 105 may send information to the device 110 based on an event. An event may act as a trigger which indicates that there is an event of importance the device 110 needs to be aware of. The trigger may further indicate that a data needs to be generated for reporting. For example, a work report may be generated based on a change in status by a user within an application. A user may have to step out of the office and set their status in a workforce management application to "away". This information will be noted, as well as when or if the user changes their status to back to an active state. Multiple instances of state changes may be compiled into reports 120. Alerts may also be generated, indicating granular activity, such as a user is suddenly unavailable online because they left their geo-fence. Alerts may also indicate patterns of behavior, such as a user regularly becoming unavailable online for more than a specified interval of time. In an embodiment, an alert may be predictive, such as indicating to a manager that their workforce may be lower due to circumstances. For example, an alert might state that "it looks like it is going to rain on Thursday, last time this happened, 14% of your employees did not come in to the office".

In another embodiment, geo-location may be utilized as a trigger. For example, geo-fencing may be set up to trigger a new report when a user enters and/or leaves a set of defined coordinates. An employee may arrive in a building, or their office, which has been defined as a geo-fence, and this information may be used by the device 110 to generate reports 120. Additionally, geo-fencing may be related to the status of a user in a workforce application. In a contact center environment, for example, the device 105 may be associated with an agent. The agent step out for coffee down the street. The agent, being logged in from a portable device, forgets to change their status, but takes their device with them. Their status may change once they leave the building, or exit the geo-fence, to indicate they have left the office.

In another embodiment, if a user changes their status manually to indicate they are not available, the application may assume that the user is outside of the geo-fence during that particular time. If the user leaves the geo-fence during a specific time, the user may automatically have their status changed to "out of office". When the user returns to the geo-fence interior with their associated device, their state may be automatically changed into an active state. A user may also be tracked by the application on the electronic device when a user is inside the fence, whether or not they are productive, and how long they are in the fence at a particular location.

In yet another embodiment, multiple geo-fences may be applied. A geo-fence may be placed on a device, such that when the device moves off of a designated wifi network (such as in the office) and onto wifi networks at other locations (such as home or a nearby café), the application automatically updates.

The device 110 may analyze the information sent from the mobile device and use this information to generate data, such as customized reports, for example. Reports 120 may be generated in a number of ways, such as in real-time, at time intervals, by specific events, or on a regular schedule, or by any other method specified by a system user. Alerts may also be generated to indicate an action needs to be taken. For example, if an agent in a contact center is not available during a certain time interval on a regular basis, critical work could be re-routed to a similarly skilled agent. In another example, a manager could be alerted that corrective action is needed towards an employee regarding their productivity.

In an embodiment, threshold levels of activity/inactivity may be used as a means of increased reporting accuracy. In a workplace environment, for example, if an employee has been inactive more than one hour, it could be assumed that the employee has left the office. If an employee has been inactive not more than 30 minutes between periods of activity, an assumption could be made that the employee may be in the office but otherwise occupied (e.g., employee TR could have been stopped by employee Ken to discuss a work related project on the way to the restroom). Activity levels may also be checked against pre-determined holidays in a calendar for the year in order to determine when people will most likely not be working. Large numbers of employees may be assumed to take the week off between Christmas and New Year's, thus resulting in a significant decrease in the work output.

In another embodiment, machine learning may also be applied to the system. A library of words frequently used when discussing a specific project may be built up to improve accuracy of reporting, such as status reports or time entries of employees. The library may be customized for each business using the application, such that keywords associated with that industry are automatically included. In another embodiment, reports generated with keyword usage can be applied in companies required to bill on an hourly basis (e.g., law firms, accounting firms, consulting firms, etc.), reducing the need to constantly track time and manually enter reports.

Figure 2:
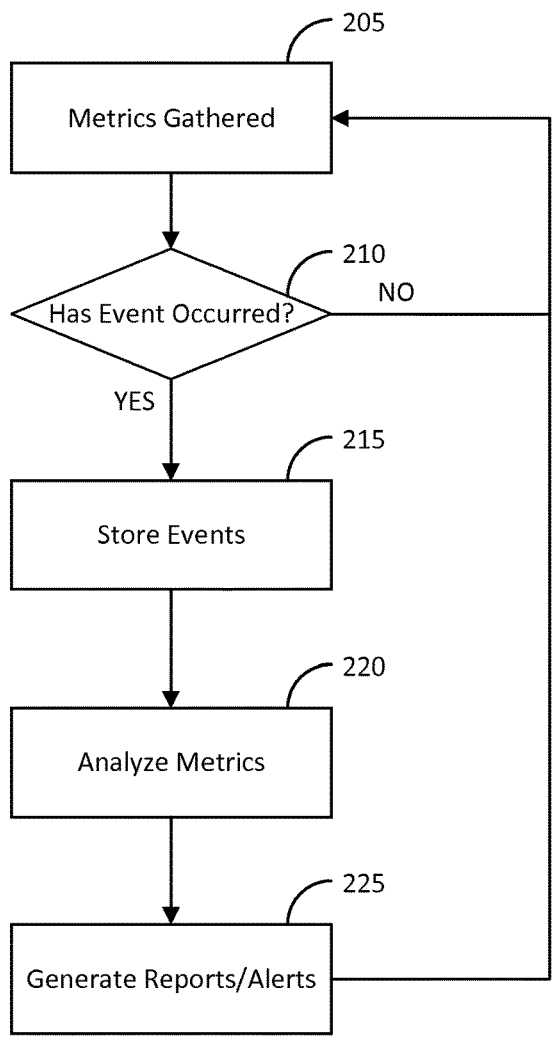
FIG. 2 is a flowchart illustrating a process for generating data.

FIG. 2 illustrates a process for generating reports, indicated generally at 200. The process 200 may occur in an application on the device 110 of the system 100 (FIG. 1). The process 200 may also occur in a constant loop, such that it is always gathering information for generating the reports.

In operation 205, metrics are gathered by a device. For example, referring to FIG. 1, the device 105 associated with a user indicates to the device 110 that the user has performed some sort of action. Actions may include updating a status manually, system log-ins or log-outs, installation, crossing a geo-fence, etc. After the user has performed an action, the device 110 communicates with the device 105 and receives updates. The device 110 may also receive information from the network 115. Information may be stored for future analysis, depending on system settings, or for real-time analysis. Additionally, the metrics may be correlated with periods of work. Control is passed to operation 210 and process 200 continues.

In operation 210, it is determined whether or not an event has occurred. If it has been determined that an event has occurred, control is passed to operation 215 and the process continues. If it has been determined that an event has not occurred, control is passed back to operation 205 and the process continues.

The determination in operation 210 may be based on any suitable criteria. For example, the action in operation 205 may be an event which triggers reporting of data. The event could also comprise a request by a user of device 110 for report generation. In an embodiment, an action could also be an event, such as a status update, a log-in or log-out, use of a keycard, the detection of entering or exiting a geo-fence, a device going to sleep, the minimization of an application, etc., which triggers report generation and/or alerts.

In operation 215, metrics related to events are stored. For example, this information may be stored for later use in generating analyses of the metrics for the reports. Any number of events may be compiled to generate reports. The metrics may be stored in a database connected to the network 115. Control is passed to operation 220 and process 200 continues.

In operation 220, metrics are analyzed. Several non-limiting examples are described. For example, keyword spotting or recognition may be applied to metrics such as chat, voice calls, and transcripts to identify any pre-defined keywords, such as those related to a specific project or industry. This information may be used to estimate the amount of time an employee may spend working on a particular project. In addition, machine learning may be applied to build libraries of words frequently used when discussing specific projects or for a specific industry. Content management activity may be monitored, which might include information such as which documents have been accessed and shared. Geo-fencing may also be examined to determine if a user of a device is where they are supposed to be. Events may be triggered when a device associated with a user crosses a geo-fence. Automatic status updates may be made regarding the employee within applications the employee is using. Threshold levels of activity or inactivity may be examined to make assumptions about employee or user behavior. The amount of time an employee is idle could indicate that the employee has stepped out of the office for an appointment, or made a quick trip to the restroom. Secondary sources may also be analyzed such as Outlook, company calendars, etc. Control is passed to operation 220 and process 200 continues.

In operation 225, reports are generated. Reports may be manually initiated or automatically (such as those triggered by events). In an embodiment, reports may measure changes and durations at a geo-location within the parameters of a geo-fence. The geo-fence or geo-location may be defined by a user of the system and tracked via GPS-enabled devices. Locations may also be Wifi network specified, such as a user's home network, or a plurality of networks the user has been known to access for various purposes. The reports may be generated in real-time, at a defined time, at specified intervals, etc. The generation of work reports may also trigger alerts. For example, in a workplace environment, a manager may be alerted when a new report is generated and be able to see the amount of time their direct reports are in the office or not using a specific application. The alert may indicate that corrective action needs to be taken by the manager, as previously described, or provide other information. Control is passed back to operation 205 and process 200 continues.

In an embodiment, the generating of a work report may also generate alerts, which may indicate to a user that a change in status has occurred of a user being monitored by the application.

One application of the embodiments described herein could be to determine if a large number of employees within a company are affected by an extraneous event, such as a traffic jam or hurricane.

Forecasting can also benefit through predicting availability for a given time period, such that a report could indicate that Employee X is always available between 7 pm and 9 pm on weekdays after they leave the physical office location.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A computerized method for generating reports comprising information related to a mobile device associated with a user, wherein the mobile device is operatively coupled to an electronic device, comprising:
   a. gathering metrics comprising one or more of: user history, status history associated with the user, chat history associated with the user, location history associated with the mobile device, location history associated with the user, and recordings of interactions involving the user, by the electronic device, from at least one of: the mobile device, one or more secondary sources associated with the electronic device, and one or more secondary sources associated with the mobile device;
   b. determining, by the electronic device, if an event comprising one of a status update, a log-in or log-out, use of a keycard, a detection of entering or exiting a geo-fence, the mobile device going into an inactive mode, and a minimization of an application has occurred, wherein if the event has occurred, storing the metrics related to the event in a database operatively connected to the electronic device through a telecommunications network;
   c. analyzing the stored metrics, by the electronic device, the analyzing comprising:
      applying keyword recognition to identify a pre-defined keyword in the user history and the chat history associated with the user;
   d. generating, by the electronic device, an activity report comprising the analyzed stored metrics, by one or more of:
      i. estimating, by the electronic device, a time the user spends working on a project associated with the pre-defined keyword;
      ii. predicting, by the electronic device, a likelihood of availability of the user based on at least the total time the user spent working on the project associated with the pre-defined keyword; and
   e. generating, by the electronic device, an alert, wherein the alert is sent to a designated user of the system, based on the analyzed stored metrics.

2. The method of claim 1, wherein the metrics are correlated with periods of activity by the user.

3. The method of claim 1, wherein the mobile device comprises at least one of: a laptop, a smart phone, a card, a wearable device, a GPS enabled device, and a Wifi enabled device.

4. The method of claim 1, wherein the electronic device comprises a computer processor.

5. The method of claim 1, wherein machine learning is applied to the metrics to construct libraries of frequently used words.

6. The method of claim 1, wherein the analyzing further comprises monitoring content management activity.

7. The method of claim 6, wherein the content management activity comprises accessing documentation, wherein the documentation is related to one or more of: the user, a product, and a project.

8. The method of claim 1, wherein the event comprises the mobile device crossing a predetermined geo-fenced location border.

9. The method of claim 1, wherein the analyzing further comprises examining predetermined threshold levels for activity of the mobile device associated with the user.

10. The method of claim 1, wherein the activity report measures at least one of: changes in location of the mobile device and duration in location of the mobile device.

11. The method of claim 1, wherein the activity report is generated in real-time.

12. The method of claim 1, wherein the activity report is generated at a pre-set interval of time.

13. The method of claim 1, further comprises the step of displaying the activity report associated with the user based on the analyzed stored metrics.

14. The method of claim 1, wherein the secondary sources comprise at least one of: calendars, web-sites, databases, and sources with reporting information.

15. A computerized method for generating data related to a first device associated with a first user and a second device associated with a second user, wherein the first device is operatively coupled to the second device over a telecommunications network, comprising:
  a. gathering metrics comprising one or more of: user history of the first user, status history associated with the first user, chat history associated with the first user, location history associated with the first user, location history associated with the first device, and recordings of interactions involving the first user, by the second device, from at least one of: the first device, one or more secondary sources associated with the second device, and one or more secondary sources associated with the first device;
  b. determining, if an event comprising one of a status update, a log-in or log-out, use of a keycard, a detection of entering or exiting a geo-fence, a first device going to an inactive mode, and a minimization of an application has occurred, by the first device, wherein if the event has occurred, notifying the second device and storing the metrics related to the event;
  c. analyzing the stored metrics, by the second device, the analyzing comprising:
    applying keyword recognition to identify a pre-defined keyword in the first user history and the chat history associated with the first user;
  d. generating, by the second device, an activity report comprising the analyzed stored metrics, by one or more of:
    i. estimating, by the second device, a time the first user spends working on a project associated with the pre-defined keyword;
    ii. predicting, by the second device, a likelihood of availability of the first user based on at least the total time the first user spent working on the project associated with the pre-defined keyword; and
  e. generating, by the second device, an alert, wherein the alert is sent to a designated user of the system, based on the analyzed stored metrics.

16. The method of claim 15, wherein the metrics are correlated with periods of activity by the first user.

17. The method of claim 15, wherein the first device comprises at least one of: a mobile device, a laptop, a smart phone, a card, a wearable device, a GPS enabled device, and a Wifi enabled device.

18. The method of claim 15, wherein the second device comprises a computer processor.

19. The method of claim 15, wherein machine learning is applied to the metrics to construct libraries of frequently used words.

20. The method of claim 15, wherein the analyzing comprises monitoring content management activity.

21. The method of claim 20, wherein the content management activity comprises accessing documentation, wherein the documentation is related to one or more of: the user, a product, and a project.

22. The method of claim 15, wherein the event comprises crossing a predetermined geo-fenced location border by the first device.

23. The method of claim 15, wherein the analyzing comprises examining predetermined threshold levels for activity of the first device.

24. The method of claim 15, wherein the activity report measures at least one of: changes in location of the first device, and duration in location of the first device.

25. The method of claim 15, wherein the activity report is generated in real-time.

26. The method of claim 15, wherein the activity report is generated at a pre-set interval of time.

27. The method of claim 15, further comprises the step of displaying the activity report associated with the user based on the analyzed stored metrics.

28. The method of claim 15, wherein the secondary sources comprise at least one of: calendars, web-sites, databases, and sources with reporting information.

29. The method of claim 1 further comprising generating a second alert, by the electronic device based on the stored metrics and a new status update of the device and the user.

30. The method of claim 15 further comprising generating a second alert, by the second device, based on the stored metrics and a new status update of the first device and the first user.

31. The method of claim 1 further comprising:
  i. calculating a total time of the mobile device in an active mode and a total time of the mobile device in the inactive mode; and
  ii. determining a period of activity, by the electronic device, based on whether the total time of the mobile device in the active mode and the inactive mode meet a threshold level.

32. The method of claim 15 further comprising:
  i. calculating a total time of the first device in an active mode and a total time of the first device in the inactive mode; and ii. determining a period of activity, by the second device, based on whether the total time of the first device in the active mode and the inactive mode meet a threshold level.

\* \* \* \* \*